United States Patent
Sade et al.

(10) Patent No.: US 10,146,538 B2
(45) Date of Patent: Dec. 4, 2018

(54) SUSPENDABLE LOAD ADDRESS TRACKING INSIDE TRANSACTIONS

(71) Applicant: Intel Corporation, Santa Clara, CA (US)

(72) Inventors: Raanan Sade, Kibutz Sarid (IL); Roman Dementiev, Heidelberg (DE); Ravi Rajwar, Portland, OR (US); Ady Tal, Zichron Yaacove (IL); Alex Gerber, Haifa (IL)

(73) Assignee: Intel Corporation, Santa Clara, CA (US)

( * ) Notice: Subject to any disclaimer, the term of this patent is extended or adjusted under 35 U.S.C. 154(b) by 106 days.

(21) Appl. No.: 15/282,011

(22) Filed: Sep. 30, 2016

(65) Prior Publication Data

US 2018/0095759 A1 Apr. 5, 2018

(51) Int. Cl.
| | |
|---|---|
| *G06F 9/312* | (2018.01) |
| *G06F 12/12* | (2016.01) |
| *G06F 9/30* | (2018.01) |
| *G06F 12/0855* | (2016.01) |
| *G06F 12/123* | (2016.01) |
| *G06F 12/0875* | (2016.01) |
| G06F 9/46 | (2006.01) |
| G06F 9/38 | (2018.01) |

(52) U.S. Cl.
CPC ...... *G06F 9/30043* (2013.01); *G06F 12/0857* (2013.01); *G06F 12/0875* (2013.01); *G06F 12/123* (2013.01); *G06F 9/3838* (2013.01); *G06F 9/466* (2013.01); *G06F 9/467* (2013.01); *G06F 2212/1024* (2013.01); *G06F 2212/452* (2013.01); *G06F 2212/69* (2013.01)

(58) Field of Classification Search
CPC ...... G06F 9/30043; G06F 9/466; G06F 9/467; G06F 9/3838; G06F 12/0857; G06F 12/0875; G06F 12/123; G06F 2212/1024; G06F 2212/452; G06F 2212/69
USPC ......... 712/203, 225, 227, 245; 711/133–136, 711/122
See application file for complete search history.

(56) References Cited

U.S. PATENT DOCUMENTS

| | | | |
|---|---|---|---|
| 8,484,438 B2 * | 7/2013 | Cypher | G06F 12/0811 711/147 |
| 2014/0047196 A1 * | 2/2014 | Frey | G06F 3/0668 711/147 |
| 2014/0281248 A1 * | 9/2014 | Alameldeen | G06F 12/0864 711/128 |

(Continued)

*Primary Examiner* — Daniel H Pan
(74) *Attorney, Agent, or Firm* — Lowenstein Sandler LLP

(57) ABSTRACT

Suspendable load address tracking inside transactions is disclosed. An example processing device of implementations of the disclosure includes a transactional memory (TM) read set tracking component circuitry to identify a suspend read tracking instruction within a transaction executed by the processing device, mark load instructions occurring in the transaction subsequent to the identified suspend read tracking instruction with a suspend attribute, wherein the addresses corresponding to the marked load instructions are excluded from a read set maintained for the transaction, identify a resume read tracking instruction within the transaction, and stop marking the load instructions occurring subsequent to the identified resume read tracking instruction with the suspend attribute.

20 Claims, 12 Drawing Sheets

(56) References Cited

U.S. PATENT DOCUMENTS

2014/0379996 A1* 12/2014 Rajwar .............. G06F 9/3004
  711/145
2015/0242250 A1* 8/2015 Guthrie .............. G06F 9/5033
  711/137

* cited by examiner

US 10,146,538 B2

SUSPENDABLE LOAD ADDRESS TRACKING INSIDE TRANSACTIONS

TECHNICAL FIELD

The embodiments of the disclosure relate generally to computing systems and in particular (but not exclusively) to suspendable load address tracking inside transactions.

BACKGROUND

To improve performance, some computer systems may execute multiple threads concurrently. Generally, before a thread accesses a shared resource, it may acquire a lock of the shared resource. In situations where the shared resource is a data structure stored in memory, all threads that are attempting to access the same resource may serialize the execution of their operations in light of mutual exclusivity provided by the locking mechanism. This may be detrimental to system performance and may cause program failures, e.g., due to deadlock bugs. To reduce performance loss resulting from utilization of locking mechanisms, some computer systems may use transactional memory. Transactional memory generally refers to a synchronization model that allows multiple threads to concurrently access a shared resource without utilizing a locking mechanism.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DESCRIPTION OF EMBODIMENTS

Figure 1:
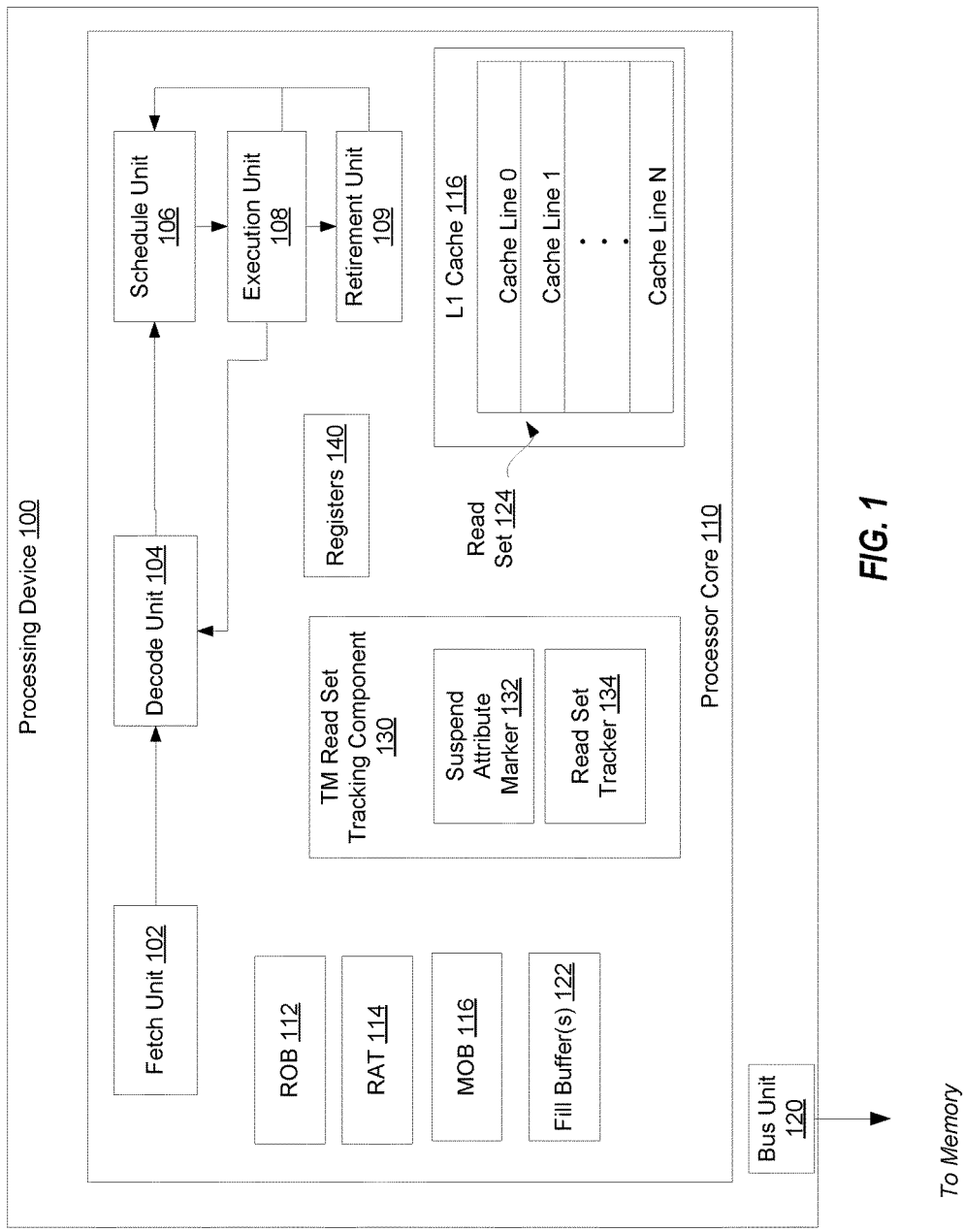
FIG. 1 illustrates a multi-node system, according to one embodiment.

Implementations of the disclosure describe techniques for suspendable load address tracking inside transactions. Implementations of the disclosure may provide a transactional memory (TM) read set tracking component circuitry to implement suspendable load address tracking for transactions executed by a processing device. A transaction may refer to a group of load and store instructions that execute in an atomic way. An operation is atomic if it appears to the rest of the system to occur simultaneously. Atomicity is a guarantee of isolation from concurrent processes. Atomic operations have a succeed-or-fail definition—they either successfully change the state of the system, or have no apparent effect. A processing device that provides for execution of transactions (i.e., "transactional execution"), supports the definition of regions of code (e.g., software implemented by execution of instructions by the processing device) that are considered a transaction (e.g., have atomicity, consistency, and isolation constraints).

To support transactional execution, the processor device may include a read set and a write set, which are structures that hold all the addresses that have been read inside the transaction and all the addresses that have been written inside the transaction, respectively. The read set and write set are maintained by the processing device in order to provide for the atomicity of a transaction. A transaction may be aborted by the processing device for a variety of reasons, two of which include conflict and capacity. With respect to conflict, data read and written to during a transaction should be isolated. As such, during transactional execution by the processing device, any external writes to an address maintained in the read set while the transaction is "alive" (e.g., after the transaction begin instruction and before the transaction end instruction) cause the transaction to abort.

With respect to capacity, the read set is maintained in a data structure with finite space. The data structure of the read set should maintain a complete and exhaustive list of all addresses read during the transaction. When an address read (e.g., loaded) during the transaction is added to a read set that is not empty, this may cause one or more addresses to be evicted (i.e., overflow) from the read set due to the limited space of the read set data structure. Such overflow of the read set (e.g., storing more data than the read set can hold) can lead to abort of the transaction.

Implementations of the disclosure provide a light-weight suspend region within a transaction that excludes load address tracking during the transactional execution. A region of code (referred to herein as a "suspend region") within a transaction may be marked for suspendable load address tracking. Two instructions may be utilized to designate such a suspend region, a suspend read tracking instruction (e.g., "XsuspndRdTrk") and a resume read tracking instructions (e.g., "XResumeRdTrk"). Addresses that are loaded within this suspend region are not added to the read set during the transaction execution of the transaction by the processing device.

The processing device may include a TM read set tracking component, including one or more circuits or circuitry, that monitors for the suspend read tracking instruction and resume read tracking instruction. The TM read set tracking component facilitates the suspension of load address tracking in a suspend region of a transaction by adding a suspend attribute to the load address instructions within the suspend region. A suspend attribute (e.g., a flag, marker, etc.) of the TM read set tracking component may add this suspend attribute to load instructions occurring after the suspend read tracking instruction is detected within a transaction and before the resume read tracking instruction is detected. During execution, the suspend attribute signals to the processing device that an address corresponding to the load instruction should not be added to the read set (even though the processing device is in a transaction execution mode).

In one implementation, the read set tracker may identify the suspend attribute during execution of a load instruction and cause the address of the load instruction to bypass storage in the read set. While the suspend attribute may cause load address tracking to be excluded in implementations of the disclosure, write set tracking for the transaction may proceed as normal during execution of the transaction (i.e., addresses of store instructions continue to be tracked by the write set).

Conventional systems for execution of transactions have drawbacks. For example, conventional systems may not provide for load address tracking suspension in any form. As such, the conventional systems suffer from more frequent occurrence of abort conditions due to conflicts and capacity overflow. Other conventional systems may provide for a full transaction suspend mode, which suspends all read and write set tracking, as well as tracking of the transaction architectural state. Such a conventional system results in significant negative performance impacts due to the processor resources used to implement the full transaction suspension. To avoid these drawbacks, in the implementations described herein, a suspend region of a transaction is implemented that temporarily suspends load address tracking in the read set, while otherwise maintaining the state of the transaction (e.g., write set, architectural state, etc.). Implementations of the disclosure provide an advantage over prior solutions by reducing the read set size and reducing occurrence of abort conditions in the transaction. This results in less processing resource (e.g., memory, execution units, etc.) usage and less processing time, thereby improving performance of the processing device.

FIG. 1 illustrates a block diagram of a processor device 100, which may support suspendable load address tracking inside transactions according to an implementation of the disclosure. The processing device 100 may be generally referred to as "processor" or "CPU". "Processor" or "CPU" herein shall refer to a device capable of executing instructions encoding arithmetic, logical, or 110 operations. In one illustrative example, a processor may include an arithmetic logic unit (ALU), a control unit, and a plurality of registers. In a further aspect, a processor may include one or more processing cores, and hence may be a single core processor, which is typically capable of processing a single instruction pipeline, or a multi-core processor, which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

As shown in FIG. 1, processing device 100 may include various components. In one implementation, processing device 100 may include one or more processor cores 110. The processing device 100 may also include a communication component (such as bus unit 120) that may be used for point-to-point communication between various components of the processing device 100. The processing device 100 may be used in a computing system (not shown) that includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another implementation, the processing device 100 may be used in a system on a chip (SoC) system. In one implementation, the SoC may comprise processing device 100 and a memory. The memory for one such system is a DRAM memory. The DRAM memory can be located on the same chip as the processor and other system components. Additionally, other logic blocks such as a memory controller or graphics controller can also be located on the chip.

The processor core(s) 110 may execute instructions of the processing device 100. The instructions may include, but are not limited to, pre-fetch logic to fetch instructions, decode logic to decode the instructions, execution logic to execute instructions and the like. The computing system may be representative of processing systems based on the Pentium® family of processors and/or microprocessors available from Intel® Corporation of Santa Clara, Calif., although other systems (including computing devices having other microprocessors, engineering workstations, set-top boxes and the like) may also be used. In one implementation, a sample computing system may execute a version of an operating system, embedded software, and/or graphical user interfaces. Thus, implementations of the disclosure are not limited to any specific combination of hardware circuitry and software.

In an illustrative example, processor core 110 may have a micro-architecture including processor logic and circuits used to implement an instruction set architecture (ISA). Processor cores with different micro-architectures can share at least a portion of a common instruction set. For example, the same register architecture of the ISA may be implemented in different ways in different micro-architectures using various techniques, including dedicated physical registers, one or more dynamically allocated physical registers using a register renaming mechanism (e.g., the use of a register alias table (RAT), a reorder buffer (ROB) and a retirement register file).

The arrows shown in FIG. 1 may illustrate the flow of instructions through the processor core 110. One or more processor cores (such as the processor core 110) may be implemented on a single IC chip (or die). Moreover, the chip may include one or more shared and/or private caches, interconnections, memory controllers, or other components. In one embodiment, processor core 110 may be utilized to provide suspendable load address tracking inside transactions.

As illustrated in FIG. 1, the processor core 110 may include a fetch unit 102 to fetch instructions for execution by the processor core 110. The instructions may be fetched from any storage device, such as memory and/or other memory devices. The processor core 110 may also include a decode unit 104 to decode the fetched instruction. For instance, the decode unit 104 may decode the fetched instruction into a plurality of micro-operations (uops).

Additionally, the processor core 110 may include a schedule unit 106. The schedule unit 106 may perform various operations associated with storing decoded instructions (e.g., received from the decode unit 104) until the instructions are ready for dispatch, e.g., until all source values of a decoded instruction become available. In one embodiment, the schedule unit 106 may schedule and/or issue (or dispatch) decoded instructions to an execution unit 108 for execution. The execution unit 108 may execute the dispatched instructions after they are decoded (e.g., by the decode unit 104) and dispatched (e.g., by the schedule unit 106). In an embodiment, the execution unit 108 may include more than one execution unit, such as a memory execution unit, an integer execution unit, a floating-point execution unit, or other execution units. Further, the execution unit 108 may execute instructions out-of-order. Hence, the processor core 110 may be an out-of-order processor core in one embodiment.

The processor core 110 may also include a retirement unit 109. The retirement unit 109 may retire executed instructions after they are committed. In an embodiment, retirement of the executed instructions may result in processor state being committed from the execution of the instructions, physical registers used by the instructions being deallocated, etc.

As shown in FIG. 1, the processor core 110 may include a reorder buffer (ROB) 112 to store information about in-flight instructions (or uops) for access by various components of the processor core 110. The processor core 110 may further include a register alias table (RAT) 114 to maintain a mapping of logical (or architectural) registers (such as those identified by operands of software instructions) to corresponding physical registers. In one embodiment, each entry in the RAT 114 may include a ROB identifier assigned to each physical register. Additionally, a memory order buffer (MOB), which may include a load buffer or a store buffer, may store pending memory operations that have not loaded or written back to memory (e.g., a memory that is external to the processor core 110).

The processor core 110 may implement suspendable load address tracking for transactions executed by the processor core 110. A transaction may refer to a group of load and store instructions that execute in an atomic way. An operation is atomic if it appears to the rest of the system to occur simultaneously. Atomicity is a guarantee of isolation from concurrent processes. Atomic operations have a succeed-or-fail definition—they either successfully change the state of the system, or have no apparent effect. A processing system, such as processing device 100, that provides for execution of transactions (i.e., "transactional execution"), supports the definition of regions of code (e.g., software implemented by execution of instructions by the processing device 100) that are considered a transaction (e.g., have atomicity, consistency, and isolation constraints).

In some implementations, an ISA of the processing device 100 may provide one or more interfaces for designating code regions for transactional execution by the processor core 110. One such interface is hardware lock elision (HLE), which is an instruction prefix-based interface designed to be backward-compatible with processors that do not provide support for transactional execution. Another interface is restricted transactional memory (RTM), which gives provides a programmer the flexibility to specify a fallback code path that is executed when a transaction cannot be successfully executed.

Transactional execution may be implemented by processor core 110 using a transaction begin instruction (e.g., XBegin, F2 prefix before lock instruction, etc.) and a transaction end instruction (e.g., XEnd, F3 prefix on store/lock instruction, etc.). When the processor core 110 encounters the transaction begin instruction, it enters a transactional execution mode where the processor core 110 provides for an atomic execution of the instructions between the transaction begin and transaction end instructions. There is no guarantee that the processor core 110 can reach the transaction end instruction, as conditions which can lead to an abort may be encountered. However, if the transaction end instruction is reached, then the transaction is committed in an atomic manner by the processor core 110.

To support transactional execution, processor core 110 may include a read set and a write set, which are structures that hold all the addresses that have been read inside the transaction and all the addresses that have been written inside the transaction, respectively. In one implementation, the L1 cache 116 may include one or more cache lines (e.g., cache lines 0 through N) that are used to implement the read set 124 for transactional execution. In some implementations, the read set 124 may be stored in locations other than the L1 cache 116, such as a different cache, in a buffer, or in memory external to processor core 110, for example.

The read set and write set are maintained by the processor core 110 in order to provide for the atomicity of a transaction. A transaction may be aborted by the processor core 110 for a variety of reasons, two of which include conflict and capacity. With respect to conflict, data read and written to during a transaction should be isolated. As such, during transactional execution by processor core 110, any external writes to an address maintained in the read set 124 while the transaction is "alive" (e.g., after the transaction begin instruction and before the transaction end instruction) cause the transaction to abort. Similarly, any reads or writes to the write set (not shown) for a transaction also cause the transaction to abort.

With respect to capacity, the read set is maintained in a data structure with finite space (e.g., L1 cache 116). The data structure of the read set 124 should maintain a complete and exhaustive list of all addresses read during the transaction. When an address read (e.g., loaded) during the transaction is added to a read set 124 that is not empty, this may cause one or more addresses to be evicted (i.e., overflow) from the read set 124 due to the limited space of the read set data structure. Such overflow of the read set 124 (e.g., storing more data than the read set 124 can hold) can lead to abort of the transaction. This is because the read set 124 cannot accurately track the addresses that are being read in the transaction due to eviction of addresses from the read set 124.

Aborting a transaction may have different results depending upon the interface used for transaction execution by the processing device 100. Such results may include rolling back to the transaction begin point and retrying the transaction, acquiring a lock, or taking a fall back path in software code.

Implementations of the disclosure provide a light-weight suspend region within a transaction that excludes load address tracking during the transactional execution. A region of code (Referred to herein as a "suspend region") within a transaction may be marked for suspendable load address tracking. Two instructions may be utilized to designate such a suspend region, a suspend read tracking instruction (e.g., "XsuspndRdTrk") and a resume read tracking instructions (e.g., "XResumeRdTrk"). Addresses that are loaded within this suspend region are not added to the read set 124 during the transaction execution of the transaction by processor core 110.

The processor core 110 may include a TM read set tracking component 130 that monitors for the suspend read tracking instruction and the resume read tracking instruction. The TM read set tracking component 130 may comprise logic, one or more circuits, and/or circuitry of the processor core 110, and may be implemented in one or more of the components of processor core 110, such as schedule unit 106, execution unit 108, and so on. The TM read set tracking component 130 may be referred to herein as TM read set tracking component circuitry. The TM read set tracking component 130 facilitates the suspension of load address tracking in a suspend region of a transaction by adding a suspend attribute to the load address instructions within the suspend region. A suspend attribute marker 132 of the TM read set tracking component 130 may add this suspend to any load instructions occurring after the suspend read tracking instruction is detected with a transaction and before the resume read tracking instruction is detected. During execution, the suspend attribute signals to the processor core 110 that an address corresponding to the load instruction should not be added to the read set 124 (even though the processor core is in a transaction execution mode). In some implementations, instead of excluding the address of the load instruction from the read set 124, the address may be added as a least-recently used (LRU) entry in the read set 124. In this case, the address corresponding to the load instruction in the suspend region is the first address to be evicted from the read set 124 should an overflow condition occur.

In one implementation, the read set tracker 134 may identify the suspend attribute during execution of a load instruction and cause the address of the load instruction to bypass storage in the read set 124. It should be noted that while the suspend attribute causes load address tracking to be excluded in implementations of the disclosure, write set tracking may proceed as normal during execution of the transaction (e.g., addresses of store instructions continue to be tracked by the write set).

Figure 2:
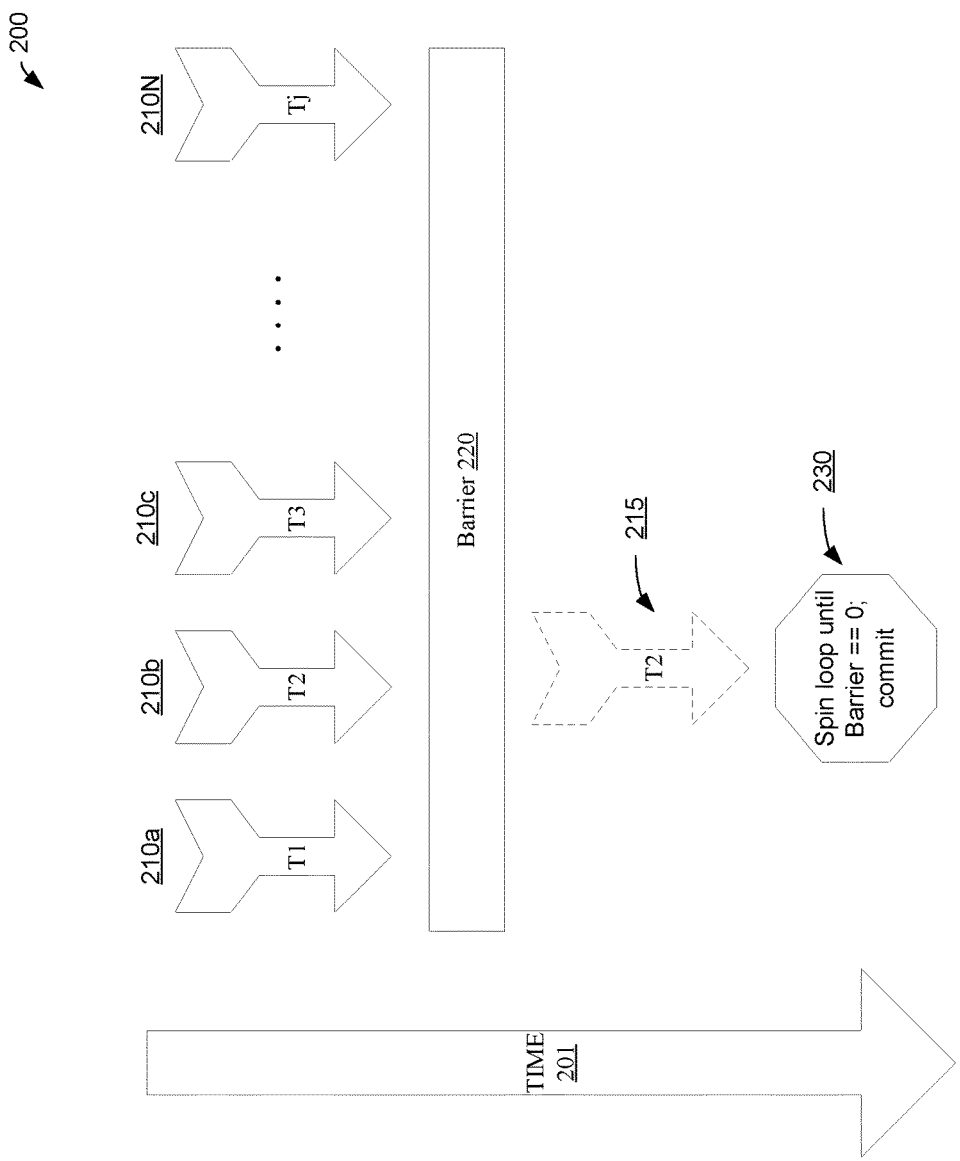
FIG. 2 illustrates an example block diagram of a system implementing suspendable load address tracking inside transactions, according to one embodiment.

The suspendable load address tracking during transaction execution described herein provides a programmer the ability to poll variables that are external to the transaction without causing the transaction to abort when such polled variables change during the transaction. As such, implementations of the disclosure prevent conflicts from occurring due to loads within the suspend region of the transaction. FIG. 2 illustrates a block diagram of a system 200 depicting an example use case for suspendable load address tracking inside transactions, according to one embodiment. System 200 depicts multiple threads T1 through Tj 210a-210N executing on a processor, such as processor core 110 described with respect to FIG. 1. Threads T1 through Tj may be executing instructions over a period of time 201 for a software program that includes a barrier 220. The barrier 220 is a synchronization point provided in source code (that the threads 210a-210N are executing) that, once reached, causes a thread 210a-210N to stop executing until all other threads 210a-210N reach the barrier 220. The barrier 220 may be a variable stored in memory that is initialized to the number of threads that are executing the source code. For example, the barrier 220 may be initialized to a value "j" in the example shown in FIG. 2. When any of the threads 210a-210N reach the barrier 220, the thread 210a-210N decrements the barrier 220 value by one and samples (i.e., reads) the current value of the barrier 220. If the value is zero, then the thread may continue executing. Otherwise, the thread samples the barrier value in a loop until the barrier value reaches zero (i.e., all other threads 210a-210N have reach the barrier 220).

Assume, for example, that thread T2 210b is executing normally (e.g., not in a transactional execution mode). When T2 210b reaches the barrier 220 before one or more of the other threads 210a-210N, it would sample (i.e., read) the barrier 220 value and determine that the barrier 220 value is not zero. In one implementation of the disclosure, T2 210b may start speculative execution 215 (e.g., enter a transactional execution mode) while waiting for the other threads 210a-210N to reach the barrier 220. When T2 210b decides it is time to commit the speculative execution 215 and continue executing "normally", T2 210b would sample the barrier 220 value inside the transaction (e.g., "spin loop"), and thus cause the address of the barrier 220 value variable to be placed into a read set for the transaction of T2 210b. Thereafter, when any other threads 210a-210N reach the barrier 220 and decrement the barrier 220 value, a conflict results for the transaction of T2 210b as the address of the barrier 220 variable is included in the read set of T2 and the write to the barrier 220 variable by the other threads 210a-210N would be considered a conflict that would abort the transaction of T2 210b.

However, the suspendable load address tracking of implementations of the disclosure can avoid the abort resulting in the above-described example. By including the load instruction corresponding to the polling of the barrier 220 value within a suspend region of T2's 210b code, address of the barrier 220 variable would not be included in the read set for T2 210b and therefore would not cause an abort when the barrier 220 value is decremented (i.e., written to) by other concurrent threads 210a-210N executing on the processor core. The load instruction corresponding to the polling of the barrier 220 value may be included in the suspend region of T2 210b by adding a suspend read tracking instruction prior to the load instruction within the transaction and by adding a resume read tracking instruction subsequent to the load instruction within the transaction. These instructions cause the processor core to add a suspend attribute to the load instruction, which, in turn, causes the processor to skip adding the address of the load instruction to the read set for the transaction. As a result, T2 210b may successfully commit any speculative execution 215 occurring beyond the barrier 220 without causing an abort and roll back of T2 210b to the barrier 220.

Referring back to FIG. 1, the suspendable load address tracking during transaction execution described herein also provides a programmer the ability to specify data structure that can be accessed without adding such data to the read set 124. This can help reduce the read set size and avoid aborts caused by overflow of the read set. One example use case is specifying dynamic compressed data structures with read-only dictionary data structure in a suspend region of a transaction. Any element lookup in the dynamic compressed data structure utilized a translation into the read-only dictionary data structure. As the dictionary is a read-only data structure, accesses to this dictionary do not have to be protected. Furthermore, elements within the dictionary can be significantly larger than elements in the compressed data structure (e.g., pointer to array vs. a 256-character string). By placing the dictionary access instructions within the suspend region of the transaction (e.g., between suspend read tracking instruction and resume read tracking instruction), the read access to the dictionary does not result in addresses being added to the read set 124 for the transaction. This reduces the size of the read set 124 and avoids overflow abort conditions.

Figure 3:
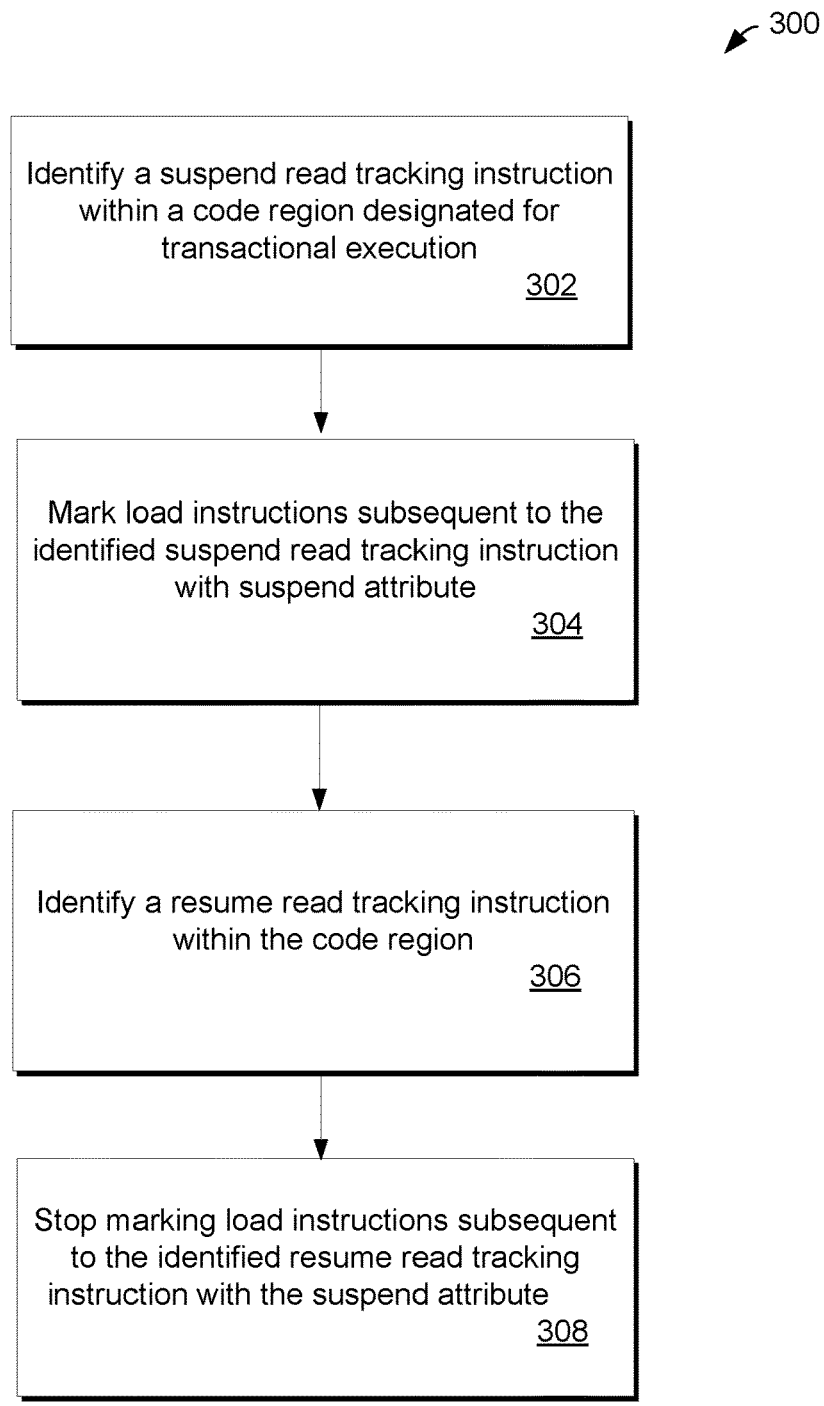
FIG. 3 is a flow diagram of a method of suspendable load address tracking inside transactions, according to one embodiment.

FIG. 3 is a flow diagram of a method 300 of suspendable load address tracking inside transactions according to another embodiment. Method 300 may be performed by processing logic that may include hardware (e.g., circuitry, dedicated logic, programmable logic, microcode, etc.), software (such as instructions run on a processor, a general purpose computer system, or a dedicated machine), firmware, microcode, or a combination thereof. In one embodiment, method 300 may be performed, in part, by processing logic implemented in TM read set tracking component 130 of FIG. 1.

For simplicity of explanation, the method 300 is depicted and described as a series of acts. However, acts in accordance with this disclosure can occur in various orders and/or concurrently and with other acts not presented and described herein. Furthermore, not all illustrated acts may be performed to implement the method 300 in accordance with the disclosed subject matter. In addition, those skilled in the art will understand and appreciate that the method 300 could alternatively be represented as a series of interrelated states via a state diagram or events.

Referring to FIG. 3, at block 302, the processing logic identifies a suspend read tracking instruction within a code region designated for transactional execution. At block 304, the processing logic marks load instructions subsequent to the identified suspend read tracking instruction with a suspend attribute. Subsequently, at block 306, a resume read tracking instruction is identified within the code region. Lastly, at block 308, load instructions subsequent to the identified resume read tracking instruction are no longer marked with the suspend attribute.

Figure 4:
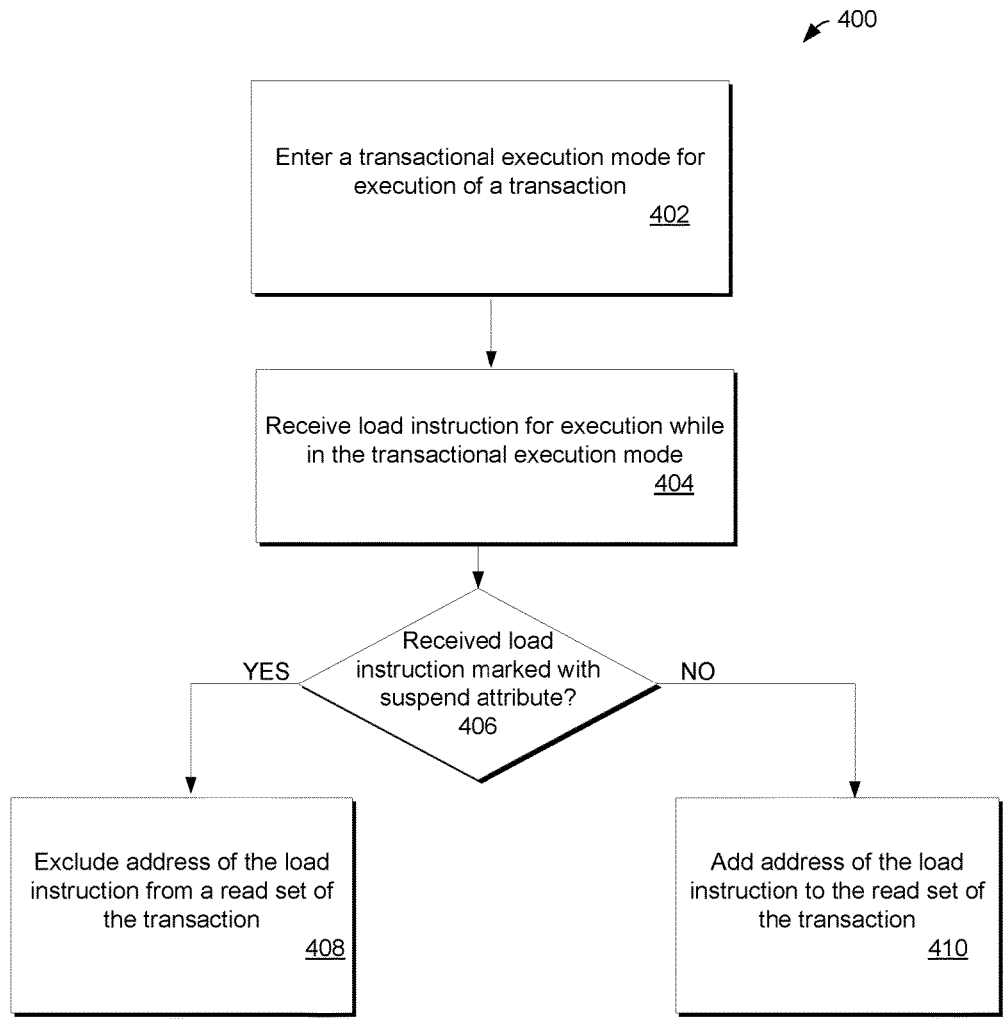
FIG. 4 is a flow diagram of another method of suspendable load address tracking inside transactions, according to another embodiment.

FIG. 4 is a flow diagram of another method 400 of suspendable load address tracking inside transactions, according to another embodiment. Method 400 may be performed by processing logic that may include hardware (e.g., circuitry, dedicated logic, programmable logic, microcode, etc.), software (such as instructions run on a processor, a general purpose computer system, or a dedicated machine), firmware, microcode, or a combination thereof. In one embodiment, method 400 may be performed, in part, by processing logic implemented in TM read set tracking component 130 of FIG. 1.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states via a state diagram or events.

Referring to FIG. 4, at block 402, the processing logic enters a transactional execution mode. In one implementation, the transaction execution mode is designated by a transaction begin instruction and a transaction end instruction in a region of code execution by the processing logic. At block 404, the processing logic receives a load instruction for execution while in the transaction execution mode. Subsequently, at decision block 406, it is determined whether the load instruction is marked with a suspend attribute. If so, then method 400 proceeds to block 408 where an address of the load instruction is excluded from a read set of the transaction. On the other hand, if the received load instruction is not marked with a suspend attribute at decision block 406, then method 400 proceeds to block 410. At block 410, the processing logic adds an address of the load instruction to the read set of the transaction.

Figure 5:
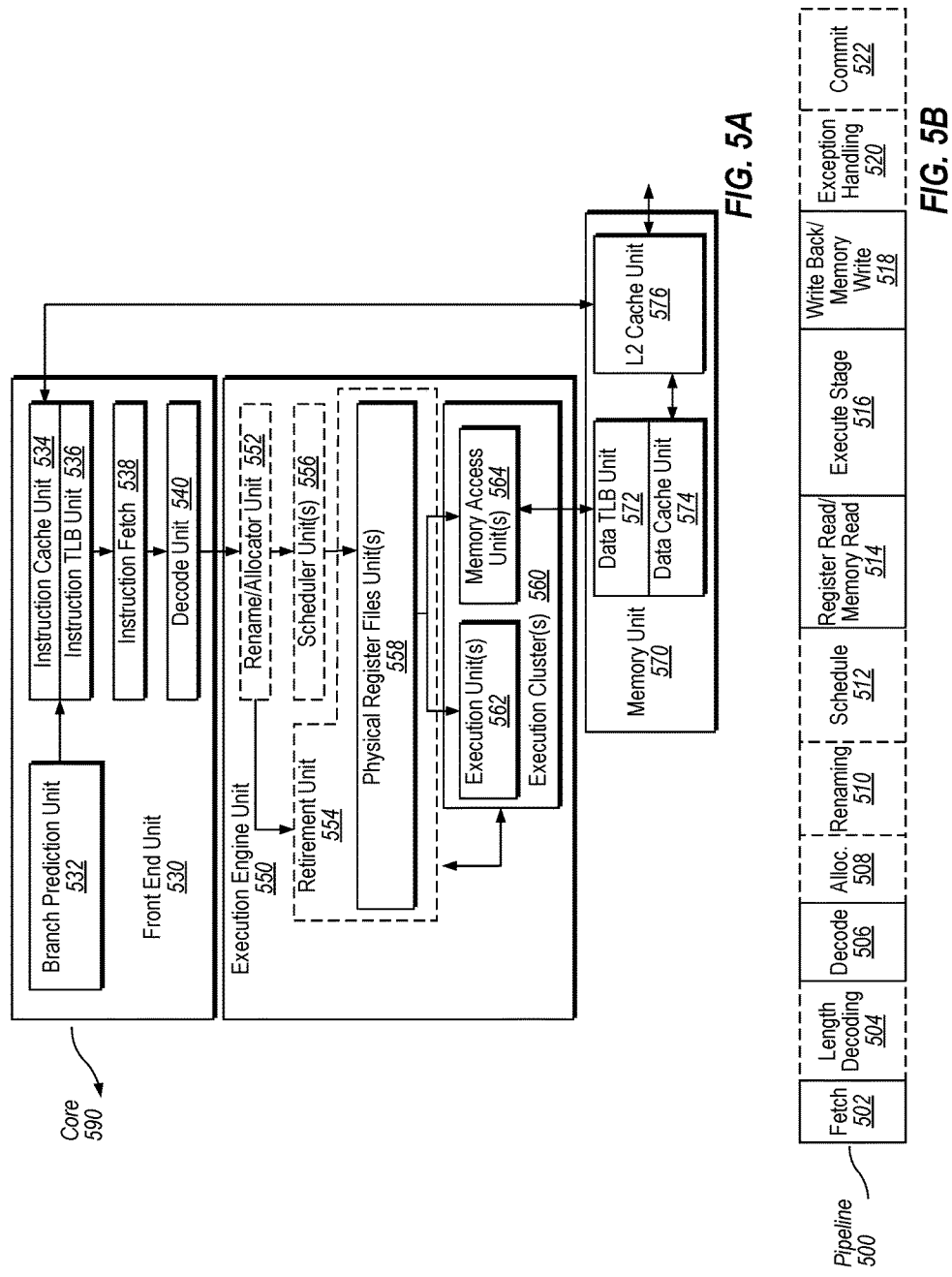
FIG. 5A is a block diagram illustrating a micro-architecture for a processor according to an implementation of the disclosure.
FIG. 5B is a block diagram illustrating an in-order pipeline and a register renaming stage, out-of-order issue/execution pipeline according to an implementation of the disclosure.

FIG. 5A is a block diagram illustrating a micro-architecture for a processor 500 that implements techniques to support suspendable load address tracking in transactions in accordance with one implementation of the disclosure. Specifically, processor 500 depicts an in-order architecture core and a register renaming logic, out-of-order issue/execution logic to be included in a processor according to at least one implementation of the disclosure.

Processor 500 includes a front end unit 530 coupled to an execution engine unit 550, and both are coupled to a memory unit 560. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one implementation, processor 500 may be a multi-core processor or may part of a multiprocessor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 560. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some implementations may include a number of execution units dedicated to specific functions or sets of functions, other implementations may include only one execution unit or multiple execution units that all perform all functions. The scheduler unit(s) 556, physical register file(s) unit(s) 558, and execution cluster(s) 560 are shown as being possibly plural because certain implementations create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain implementations are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data TLB unit 572, a data cache unit (DCU) 574, and a level 2 (L2) cache unit 576, to name a few examples. In some implementations DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary implementation, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one implementation, a data prefetcher speculatively loads/prefetches data to the DCU 574 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

In one implementation, processor 500 may be the same as processing device 100 and/or processor core 110 described with respect to FIG. 1 to support suspendable load address tracking in transactions in a processing device described with respect to implementations of the disclosure.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated implementation of the processor also includes a separate instruction and data cache units and a shared L2 cache unit, alternative implementations may have a single internal cache for both instructions and data, such as, for example, a Level 1 (L1) internal cache, or multiple levels of internal cache. In some implementations, the system may include a combination of an internal cache and an external cache that is external to the core and/or the processor. Alternatively, all of the cache may be external to the core and/or the processor.

FIG. 5B is a block diagram illustrating a pipeline 501 including an in-order pipeline and a register renaming stage, out-of-order issue/execution pipeline implemented by processor 500 of FIG. 5A according to some implementations of the disclosure. The solid lined boxes in FIG. 5B illustrate an in-order pipeline, while the dashed lined boxes illustrates a register renaming, out-of-order issue/execution pipeline. In FIG. 5B, a processor pipeline 501 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some implementations, the ordering of stages 502-524 may be different than illustrated and are not limited to the specific ordering shown in FIG. 5B.

Figure 6:
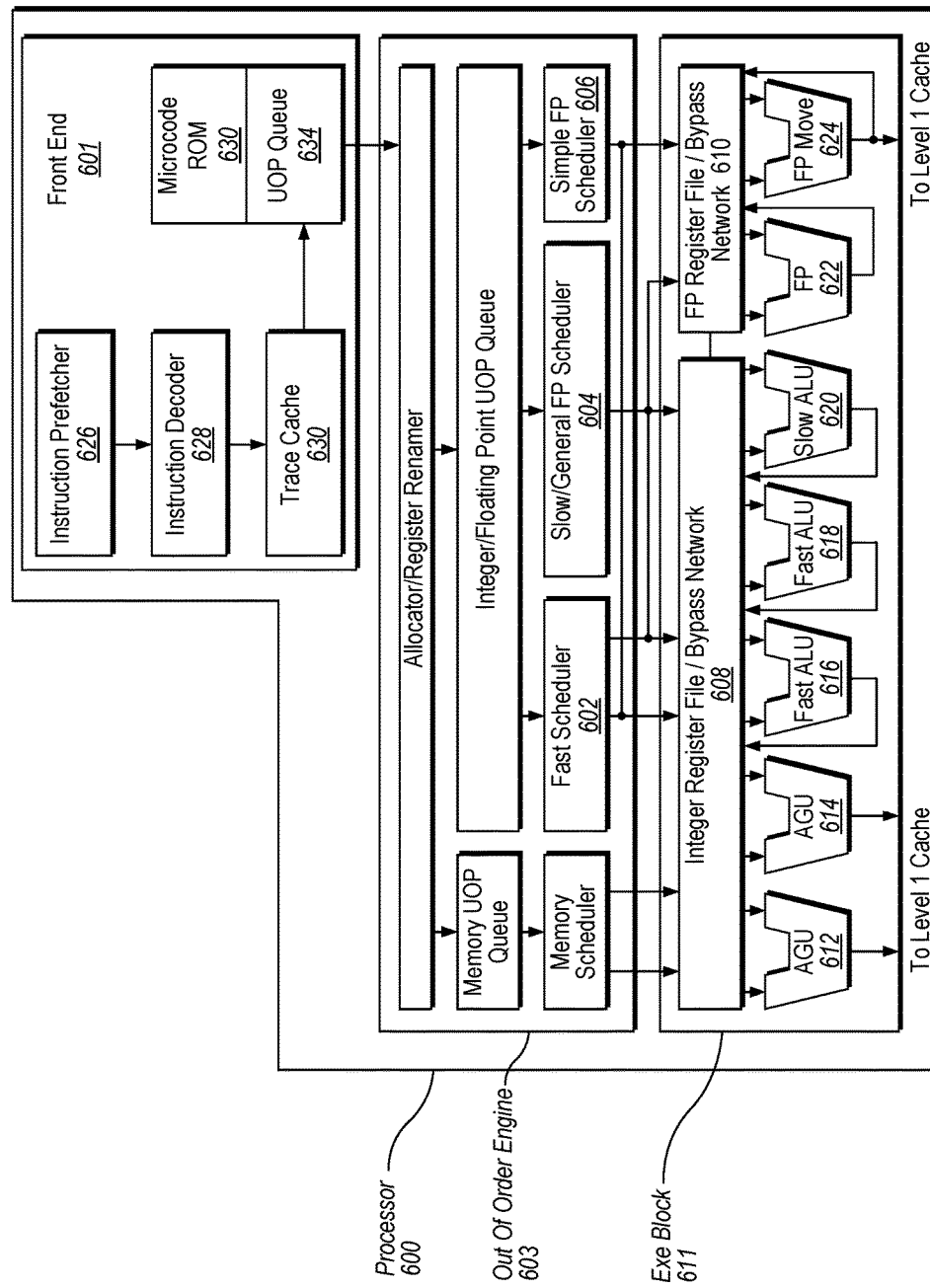
FIG. 6 is a block diagram illustrating a micro-architecture for a processor in accordance with one implementation of the disclosure.

FIG. 6 illustrates a block diagram of the micro-architecture for a processor 600 that includes logic circuits to support suspendable load address tracking in transactions in accordance with one implementation of the disclosure. In some implementations, an instruction in accordance with one implementation can be implemented to operate on data elements having sizes of byte, word, doubleword, quadword, etc., as well as datatypes, such as single and double precision integer and floating point datatypes. In one implementation the in-order front end 601 is the part of the processor 600 that fetches instructions to be executed and prepares them to be used later in the processor pipeline.

The front end 601 may include several units. In one implementation, the instruction prefetcher 626 fetches instructions from memory and feeds them to an instruction decoder 628 which in turn decodes or interprets them. For example, in one implementation, the decoder decodes a received instruction into one or more operations called "micro-instructions" or "micro-operations" (also called micro op or uops) that the machine can execute. In other implementations, the decoder parses the instruction into an opcode and corresponding data and control fields that are used by the micro-architecture to perform operations in accordance with one implementation. In one implementation, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one implementation, if more than four micro-ops are needed to complete an instruction, the decoder 628 accesses the microcode ROM 632 to do the instruction. For one implementation, an instruction can be decoded into a small number of micro ops for processing at the instruction decoder 628. In another implementation, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one implementation from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one implementation can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one implementation also includes a bypass network that can bypass or forward just completed results that have not yet been written into the register file to new dependent uops. The integer register file 608 and the floating point register file 610 are also capable of communicating data with the other. For one implementation, the integer register file 608 is split into two separate register files, one register file for the low order 32 bits of data and a second register file for the high order 32 bits of data. The floating point register file 610 of one implementation has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one implementation is comprised of a number of execution units: address generation unit (AGU) 612, AGU 614, fast ALU 616, fast ALU 618, slow ALU 620, floating point ALU 622, floating point move unit 624. For one implementation, the floating point execution blocks 622, 624, execute floating point, MMX, SIMD, and SSE, or other operations. The floating point ALU 622 of one implementation includes a 64 bit by 64 bit floating point divider to execute divide, square root, and remainder micro-ops. For implementations of the disclosure, instructions involving a floating point value may be handled with the floating point hardware.

In one implementation, the ALU operations go to the high-speed ALU execution units 616, 618. The fast ALUs 616, 618, of one implementation can execute fast operations with an effective latency of half a clock cycle. For one implementation, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one implementation, the integer ALUs 616, 618, 620, are described in the context of performing integer operations on 64 bit data operands. In alternative implementations, the ALUs 616, 618, 620, can be implemented to support a variety of data bits including 16, 32, 128, 256, etc. Similarly, the floating point units 622, 624, can be implemented to support a range of operands having bits of various widths. For one implementation, the floating point units 622, 624, can operate on 128 bits wide packed data operands in conjunction with SIMD and multimedia instructions.

In one implementation, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one implementation of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an implementation should not be limited in meaning to a particular type of circuit. Rather, a register of an implementation is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one implementation, integer registers store thirty-two bit integer data. A register file of one implementation also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one implementation, in storing packed data and integer data, the registers do not need to differentiate between the two data types. In one implementation, integer and floating point are either contained in the same register file or different register files. Furthermore, in one implementation, floating point and integer data may be stored in different registers or the same registers.

Figure 7:
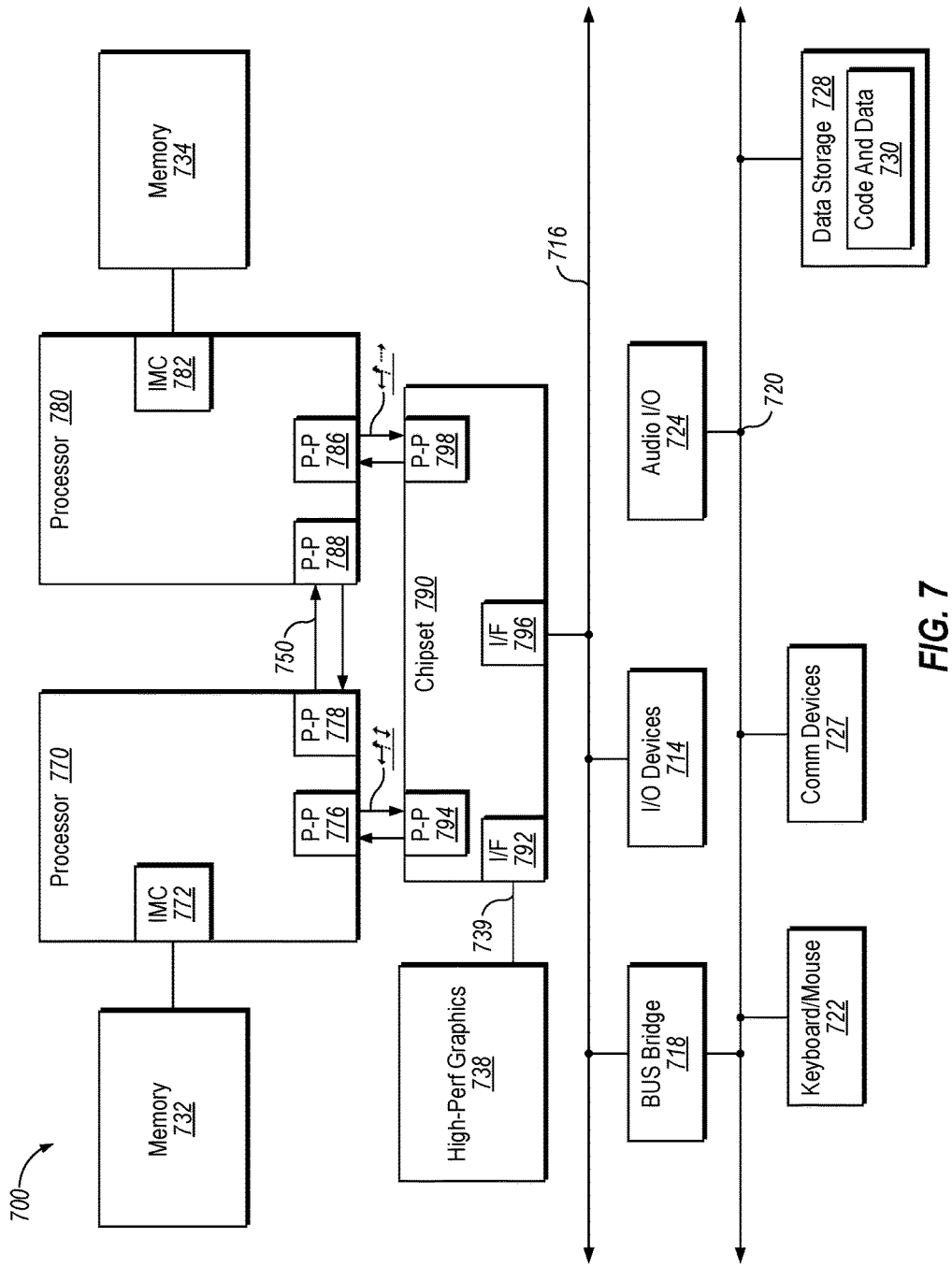
FIG. 7 is a block diagram illustrating a system in which an implementation of the disclosure may be used.

Implementations may be implemented in many different system types. Referring now to FIG. 7, shown is a block diagram illustrating a system 700 in which an implementation of the disclosure may be used. As shown in FIG. 7, multiprocessor system 700 is a point-to-point interconnect system, and includes a first processor 760 and a second processor 780 coupled via a point-to-point interconnect 750. While shown with only two processors 760, 780, it is to be understood that the scope of implementations of the disclosure is not so limited. In other implementations, one or more additional processors may be present in a given processor. In one implementation, the multiprocessor system 700 may support suspendable load address tracking in transactions as described herein.

Processors 760 and 780 are shown including integrated memory controller units 762 and 782, respectively. Processor 760 also includes as part of its bus controller units point-to-point (P-P) interfaces 766 and 768; similarly, second processor 780 includes P-P interfaces 786 and 788. Processors 760, 780 may exchange information via a point-to-point (P-P) interface 750 using P-P interface circuits 768, 788. As shown in FIG. 7, IMCs 762 and 782 couple the processors to respective memories, namely a memory 732 and a memory 734, which may be portions of main memory locally attached to the respective processors.

Processors 760, 780 may exchange information with a chipset 790 via individual P-P interfaces 752, 754 using point to point interface circuits 766, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one implementation, first bus 716 may be a Peripheral Component Interconnect (PCI) bus, or a bus such as a PCI Express bus or another third generation I/O interconnect bus, although the scope of the disclosure is not so limited.

As shown in FIG. 7, various I/O devices 714 may be coupled to first bus 716, along with a bus bridge 718, which couples first bus 716 to a second bus 720. In one implementation, second bus 720 may be a low pin count (LPC) bus. Various devices may be coupled to second bus 720 including, for example, a keyboard and/or mouse 722, communication devices 726 and a storage unit 728 such as a disk drive or other mass storage device, which may include instructions/code and data 730, in one implementation. Further, an audio I/O 724 may be coupled to second bus 720. Note that other architectures are possible. For example, instead of the point-to-point architecture of FIG. 7, a system may implement a multi-drop bus or other such architecture.

Figure 8:
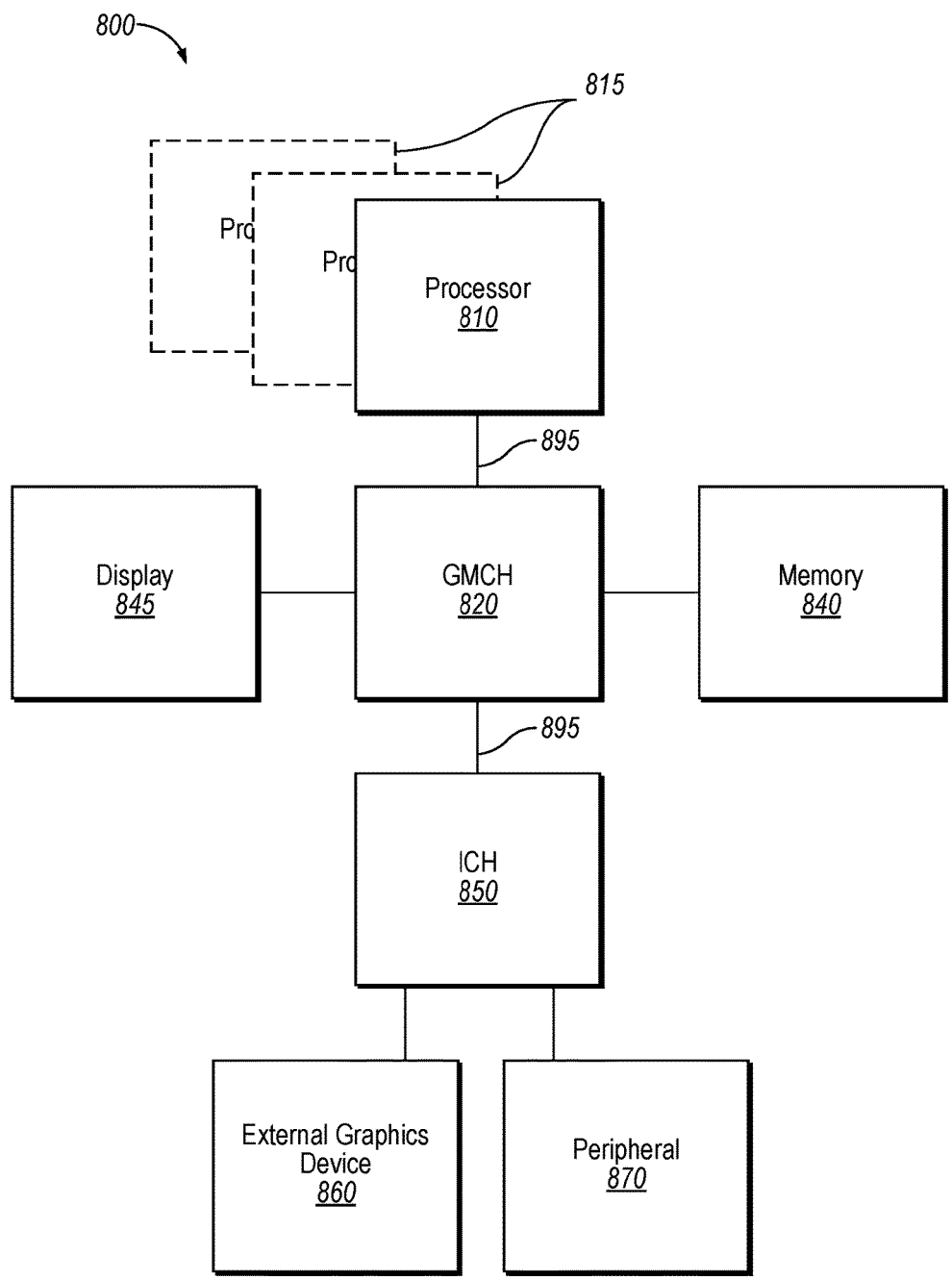
FIG. 8 is a block diagram illustrating a system in which an implementation of the disclosure may operate.

Referring now to FIG. 8, shown is a block diagram of a system 800 in which one implementation of the disclosure may operate. The system 800 may include one or more processors 810, 815, which are coupled to graphics memory controller hub (GMCH) 820. The optional nature of additional processors 815 is denoted in FIG. 8 with broken lines. In one implementation, processors 810, 815 support suspendable load address tracking in transactions according to implementations of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one implementation, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one implementation, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the implementation of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one implementation, the various processors 810, 815 may reside in the same die package.

Figure 9:
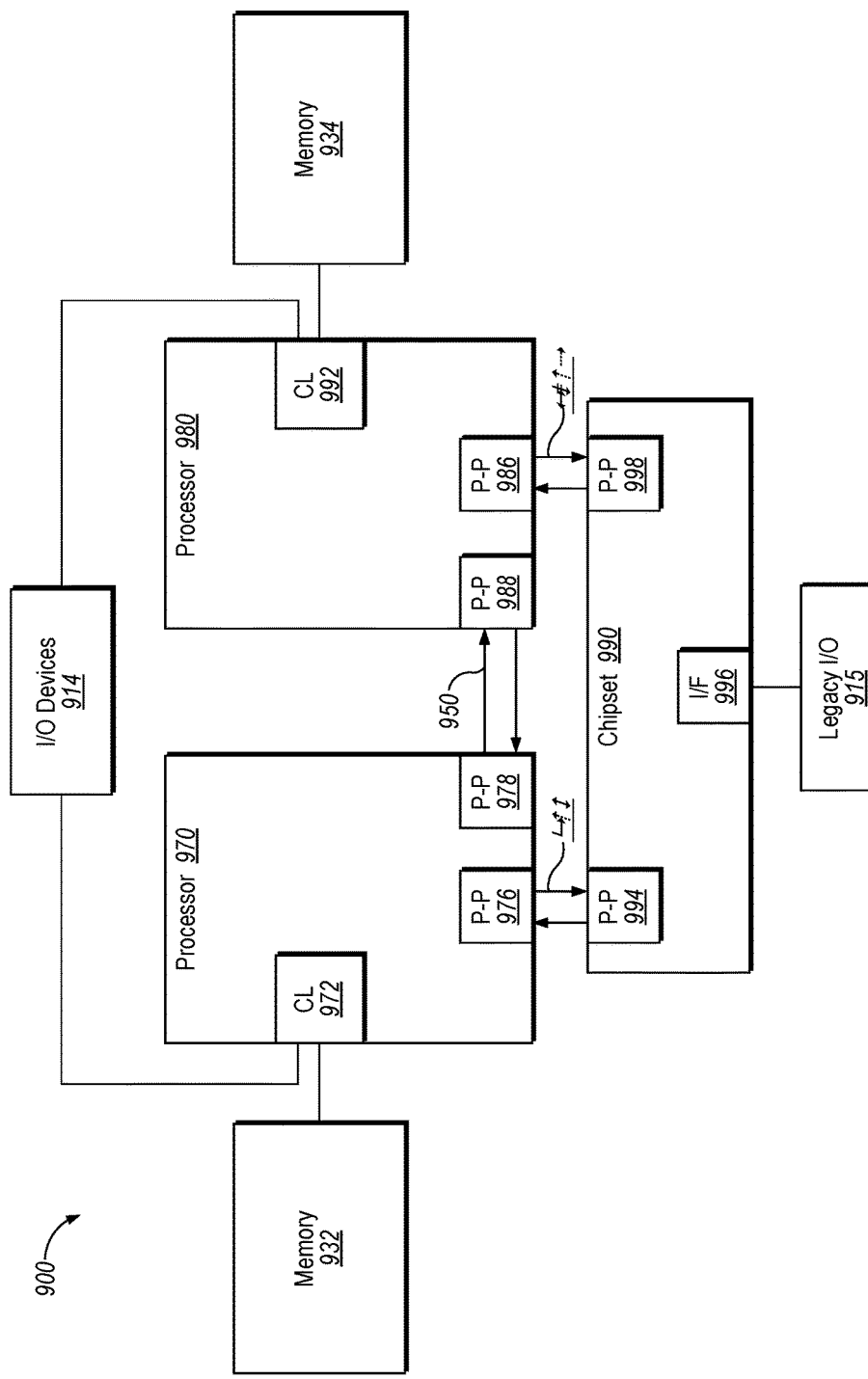
FIG. 9 is a block diagram illustrating a system in which an implementation of the disclosure may operate.

Referring now to FIG. 9, shown is a block diagram of a system 900 in which an implementation of the disclosure may operate. FIG. 9 illustrates processors 970, 980. In one implementation, processors 970, 980 may support suspendable load address tracking in transactions as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one implementation, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
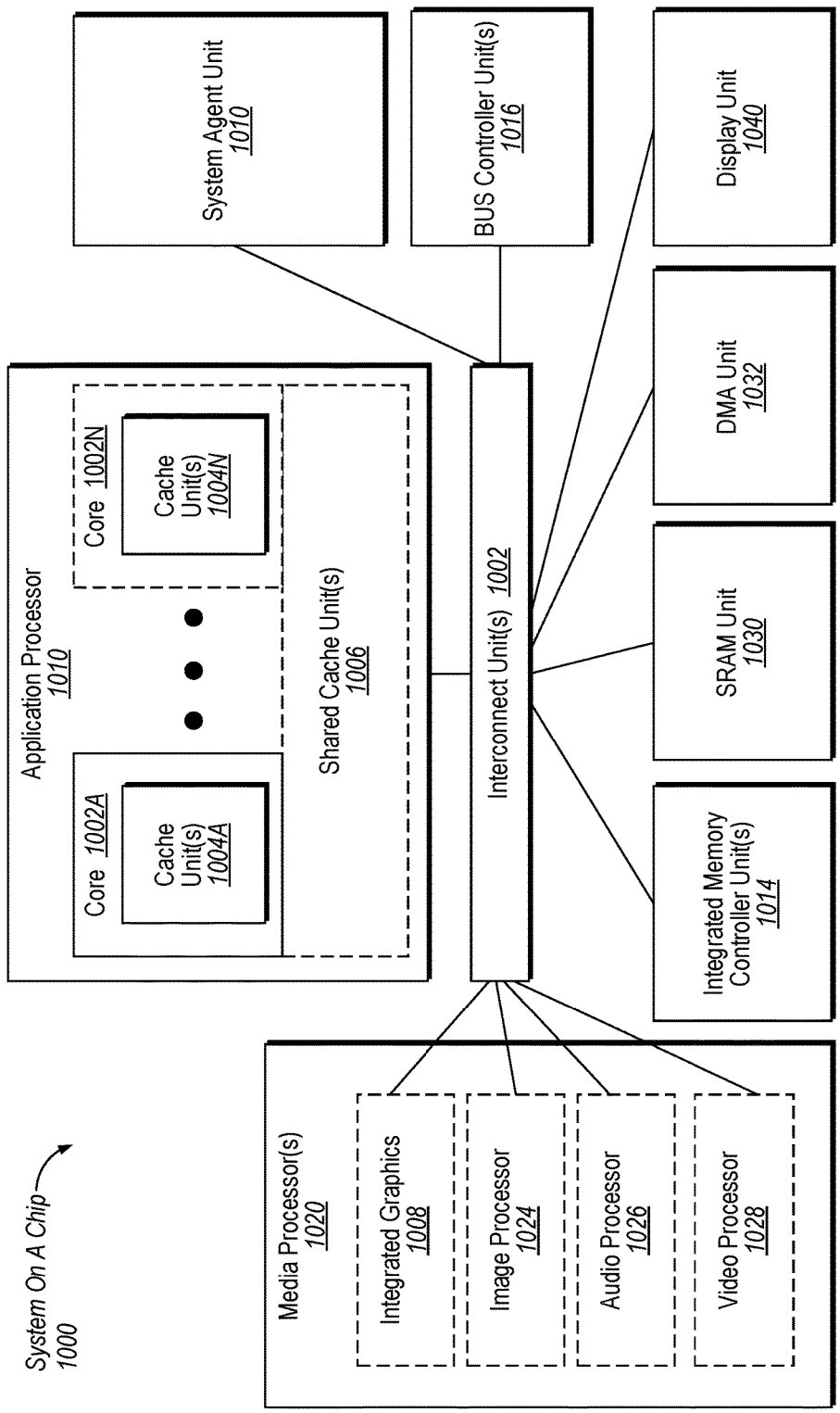
FIG. 10 is a block diagram illustrating a System-on-a-Chip (SoC) according to an implementation of the disclosure.

Implementations may be implemented in many different system types. FIG. 10 is a block diagram of a SoC 1000 in accordance with an implementation of the disclosure.

Dashed lined boxes are optional features on more advanced SoCs. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one implementation, a memory module may be included in the integrated memory controller unit(s) 1014. In another implementation, the memory module may be included in one or more other components of the SoC 1000 that may be used to access and/or control a memory. The application processor 1020 may include a TM read set tracking component for implementing suspendable load address tracking in transactions as described in implementations herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some implementations, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i6, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
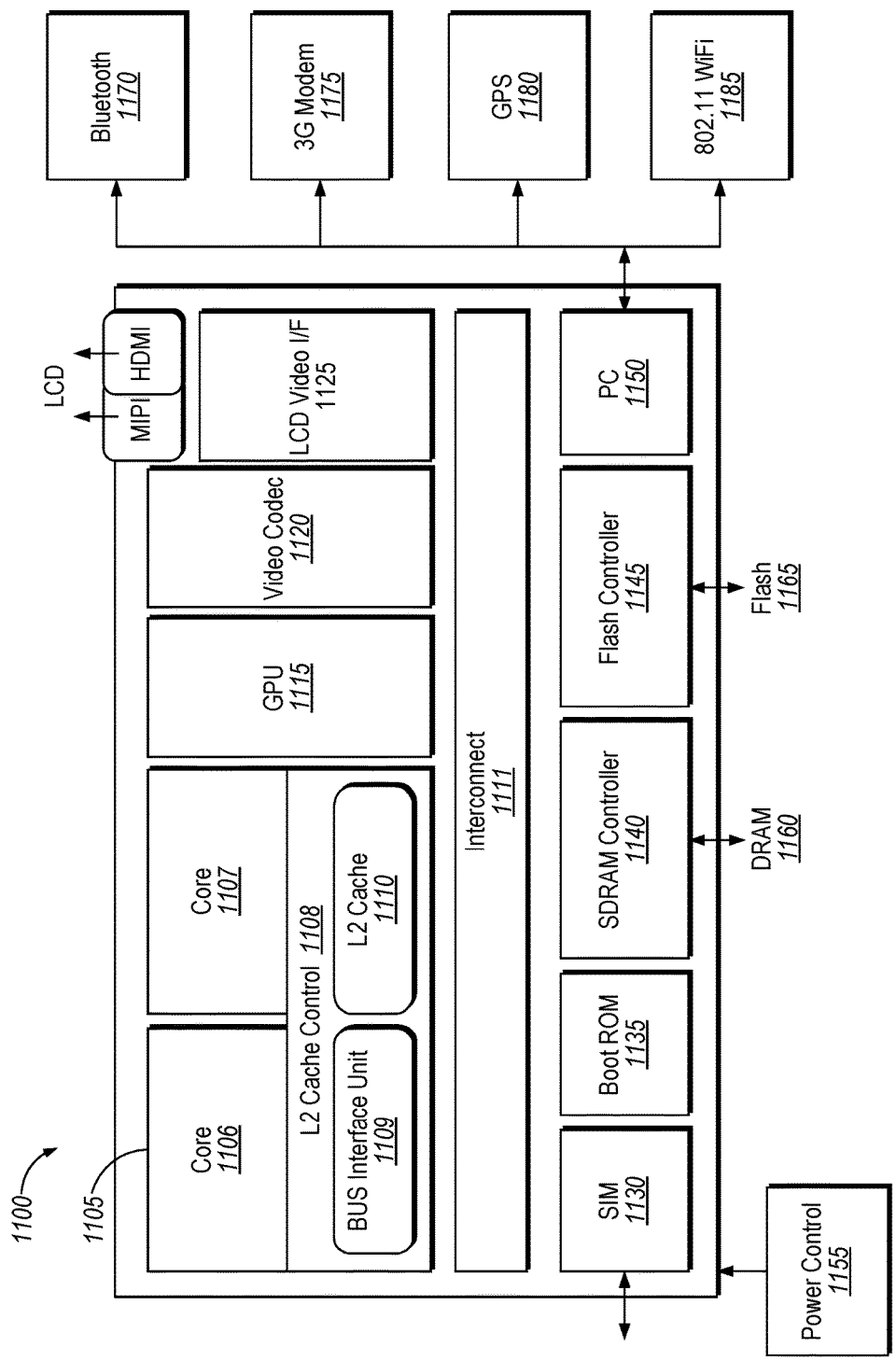
FIG. 11 is a block diagram illustrating a SoC design according to an implementation of the disclosure.

FIG. 11 is a block diagram of an implementation of a system on-chip (SoC) design in accordance with the disclosure. As a specific illustrative example, SoC 1100 is included in user equipment (UE). In one implementation, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1106. Cores 1106 and 1106 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1106 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one implementation, cores 1106, 1106 may support suspendable load address tracking in transactions described in implementations herein.

Interconnect 1110 provides communication channels to the other components, such as a Subscriber Identity Module (SIM) 1130 to interface with a SIM card, a boot ROM 1135 to hold boot code for execution by cores 1106 and 1106 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
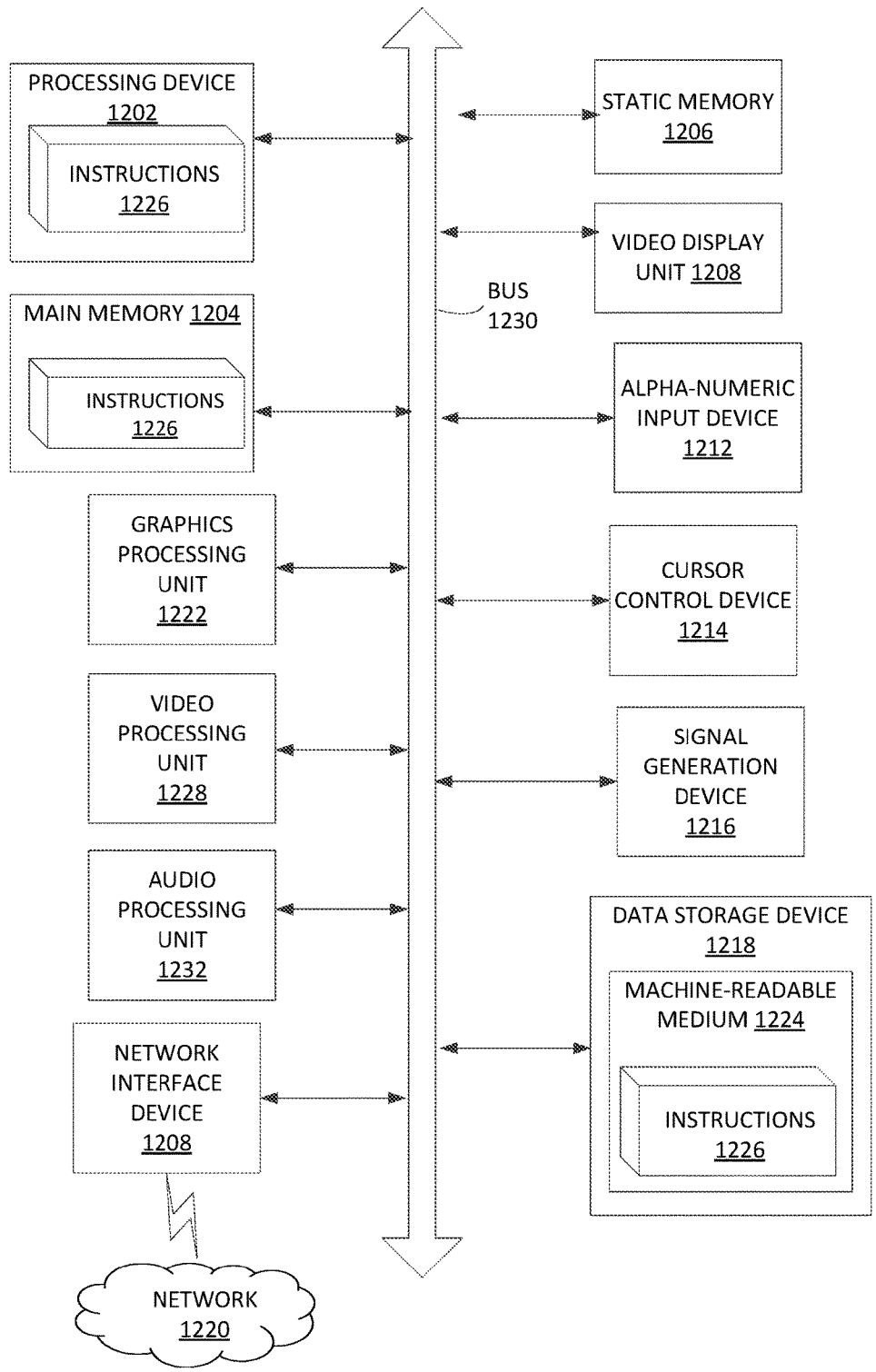
FIG. 12 illustrates a block diagram illustrating a computer system according to an implementation of the disclosure.

FIG. 12 illustrates a diagrammatic representation of a machine in the example form of a computer system 1200 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one implementation, processing device 1202 may include one or processing cores. The processing device 1202 is configured to execute the processing logic 1226 for performing the operations and steps discussed herein. In one implementation, processing device 1202 is the same as processor architecture 100 described with respect to FIG. 1 that implements suspendable load address tracking in transactions as described herein with implementations of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a non-transitory machine-accessible storage medium 1224 on which is stored software 1226 implementing any one or more of the methodologies of functions described herein, such as implementing suspendable load address tracking in transactions as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The non-transitory machine-readable storage medium 1224 may also be used to store instructions 1226 implementing suspendable load address tracking in transactions such as described with respect to processing device 100 in FIG. 1, and/or a software library containing methods that call the above applications. While the non-transitory machine-accessible storage medium 1224 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

The following examples pertain to further embodiments. Example 1 is a processing device for implementing suspendable load address tracking inside transactions. Further to Example 1, a processing device comprises a transactional memory (TM) read set tracking component circuitry to identify a suspend read tracking instruction within a transaction executed by the processing device, mark the load instructions occurring subsequent to the identified suspend read tracking instruction with a suspend attribute, wherein the addresses corresponding to the marked load instructions are excluded from a read set maintained for the transaction, identify a resume read tracking instruction within the transaction, and stop marking the load instructions occurring subsequent to the identified resume read tracking instruction with the suspend attribute.

In Example 2, the subject matter of Example 1 can optionally include the read set comprises a data structure maintained in a L1 cache of the processing device. In Example 3, the subject matter of any one of Examples 1-2 can optionally include the transaction is designated by a begin transaction instruction and an end transaction instruction. In Example 4, the subject matter of any one of Examples 1-3 can optionally include wherein a region of the transaction designated by the suspend read tracking instruction and the resume read tracking instruction comprises a suspend region of the transaction.

In Example 5, the subject matter of any one of Examples 1-4 can optionally include wherein the addresses corresponding to the marked load instructions are added to the read set as least recently used (LRU) entries in the read set. In Example 6, the subject matter of any one of Examples 1-5 can optionally include wherein the suspend read set tracking instruction comprises a XSuspndRdTrk instruction. In Example 7, the subject matter of any one of Examples 1-6 can optionally include wherein the suspend read set tracking instruction comprises a XResumeRdTrk instruction. In Example 8, the subject matter of any one of Examples 1-7 can optionally include wherein the transaction comprises a group of load and store instructions are executed by the processing device atomically. All optional features of the apparatus described above may also be implemented with respect to the method or process described herein.

Example 9 is a method for implementing suspendable load address tracking inside transactions comprising entering a transactional execution mode for execution of a transaction by a processing device, receiving a load instruction for execution in the transactional execution mode, determining, by the processing device, that the received load instruction is marked with a suspend attribute, and responsive to determined that the received load instruction is marked, excluding, by the processing device, an address corresponding to the received load instruction from a read set maintained for the transaction.

In Example 10, the subject matter of Example 9 can optionally include wherein the transaction comprises a group of load and store instructions are executed by the processing device atomically. In Example 11, the subject matter of any one of Examples 9-10 can optionally include wherein the suspend attribute is added to the load instruction responsive to the load instruction occurring during a suspend region of the transaction. In Example 12, the subject matter of any one of Examples 9-11 can optionally include wherein the suspend region is a portion of the transaction designated by a suspend read tracking instruction and a resume read tracking instruction.

In Example 13, the subject matter of any one of Examples 9-12 can optionally include receiving another load instruction for execution in the transactional execution mode, determining that the another load instruction is not marked with the suspend attribute, and responsive to determine that the another load instruction is not marked, adding an address corresponding to the another load instruction to the read set. In Example 14, the subject matter of any one of Examples 9-13 can optionally include wherein the read set comprises a data structure maintained in a L1 cache of the processing device. In Example 15, the subject matter of any one of Examples 9-14 can optionally include wherein the address corresponding to the marked load instruction is added to the read set as least recently used (LRU) entry in the read set.

Example 16 is a system for implementing suspendable load address tracking inside transactions. In Example 16, the system includes a read set data structure to store addresses corresponding to load instructions occurring during a transaction executed by the processing device and transactional memory (TM) read set tracking component circuitry. Further to Example 16, the TM read set tracking component circuitry is to identify a suspend read tracking instruction within the transaction, mark the load instructions occurring subsequent to the identified suspend read tracking instruction with a suspend attribute, wherein the addresses corresponding to the marked load instructions are excluded from the read set data structure, identify a resume read tracking instruction within the transaction, and stop marking the load instructions occurring subsequent to the identified resume read tracking instruction with the suspend attribute.

In Example 17, the subject matter of Example 16 can optionally include wherein the read set comprises a data structure maintained in a L1 cache of the processing device. In Example 18, the subject matter of any one of Examples 16-17 can optionally include wherein the transaction is designated by a begin transaction instruction and an end transaction instruction.

In Example 19, the subject matter of any one of Examples 16-18 can optionally include wherein a region of the transaction designated by the suspend read tracking instruction and the resume read tracking instruction comprises a suspend region of the transaction. In Example 20, the subject matter of any one of Examples 16-19 can optionally include wherein the addresses corresponding to the marked instructions are added to the read set as least recently used (LRU) entries in the read set.

In Example 21, the subject matter of any one of Examples 16-20 can optionally include wherein the suspend read set tracking instruction comprises a XSuspndRdTrk instruction. In Example 22, the subject matter of any one of Examples 16-21 can optionally include wherein the suspend read set tracking instruction comprises a XResumeRdTrk instruction. In Example 23, the subject matter of any one of Examples 16-22 can optionally include wherein the transaction comprises a group of load and store instructions are executed by the processing device atomically. All optional features of the system described above may also be implemented with respect to the method or process described herein.

Example 24 is a non-transitory computer-readable medium for implementing suspendable load address tracking inside transactions. In Example 24, the non-transitory machine-readable medium includes data that, when accessed by a processing device, cause the processing device to perform operations comprising entering a transactional execution mode for execution of a transaction by a processing device, receiving a load instruction for execution in the transactional execution mode, determining, by the processing device, that the received load instruction is marked with a suspend attribute, and responsive to determined that the received load instruction is marked, excluding, by the processing device, an address corresponding to the received load instruction from a read set maintained for the transaction.

In Example 25, the subject matter of Example 24 can optionally include wherein the transaction comprises a group of load and store instructions are executed by the processing device atomically. In Example 26, the subject matter of Examples 24-25 can optionally include wherein the suspend attribute is added to the load instruction responsive to the load instruction occurring during a suspend region of the transaction.

In Example 27, the subject matter of Examples 24-26 can optionally include wherein the suspend region is a portion of the transaction designated by a suspend read tracking instruction and a resume read tracking instruction. In Example 28, the subject matter of Examples 24-27 can optionally include receiving another load instruction for execution in the transactional execution mode, determining that the another load instruction is not marked with the suspend attribute, and responsive to determine that the another load instruction is not marked, adding an address corresponding to the another load instruction to the read set.

In Example 29, the subject matter of Examples 24-28 can optionally include wherein the read set comprises a data structure maintained in a L1 cache of the processing device. In Example 30, the subject matter of Examples 24-29 can optionally include wherein the address corresponding to the marked load instruction is added to the read set as least recently used (LRU) entry in the read set.

Example 31 is an apparatus for implementing suspendable load address tracking inside transactions comprising means for entering a transactional execution mode for execution of a transaction by a processing device, means for receiving a load instruction for execution in the transactional execution mode, means for determining, by the processing device, that the received load instruction is marked with a suspend attribute, and responsive to determined that the received load instruction is marked, means for excluding, by the processing device, an address corresponding to the received load instruction from a read set maintained for the transaction. In Example 32, the subject matter of Example 31 can optionally include the apparatus further configured to perform the method of any one of the Examples 10 to 15.

Example 33 is at least one machine readable medium comprising a plurality of instructions that in response to being executed on a computing device, cause the computing device to carry out a method according to any one of Examples 9 to 15. Example 34 is an apparatus for implementing suspendable load address tracking inside transactions configured to perform the method of any one of Examples 9 to 15. Example 35 is an apparatus for implementing suspendable load address tracking inside transactions comprising means for performing the method of any one of claims 9 to 15. Specifics in the Examples may be used anywhere in one or more embodiments.

Various implementations may have different combinations of the operational features described above. For instance, all optional features of the methods described above may also be implemented with respect to a non-transitory, computer-readable storage medium. Specifics in the examples may be used anywhere in one or more implementations.

While the disclosure has been described with respect to a limited number of implementations, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as can be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one implementation, refers to some apparatus, logic, hardware, and/or element designed in such a way to enable use of the apparatus, logic, hardware, and/or element in a specified manner. Note as above that use of to, capable to, or operable to, in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one implementation, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform implementations of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation and other exemplarily language does not necessarily refer to the same implementation or the same example, but may refer to different and distinct implementations, as well as potentially the same implementation.

What is claimed is:

1. A processing device, comprising:
   a transactional memory (TM) read set tracking component circuitry to:
      identify a suspend read tracking instruction within a transaction executed by the processing device;
      mark load instructions occurring in the transaction subsequent to the identified suspend read tracking instruction with a suspend attribute, wherein addresses corresponding to the marked load instructions are excluded from a read set maintained for the transaction, wherein store instructions in a suspend region designated by the suspend read tracking instruction are not marked with the suspend attribute and are treated as transactional store instructions;
      identify a resume read tracking instruction within the transaction, wherein the resume read tracking instruction designates an end of the suspend region; and
      stop marking the load instructions occurring subsequent to the identified resume read tracking instruction with the suspend attribute.

2. The processing device of claim 1, wherein the read set comprises a data structure maintained in a L1 cache of the processing device.

3. The processing device of claim 1, wherein the transaction is designated by a begin transaction instruction and an end transaction instruction.

4. The processing device of claim 1, wherein the addresses corresponding to the marked load instructions are added to the read set as least recently used (LRU) entries in the read set.

5. The processing device of claim 1, wherein the suspend read set tracking instruction is an XSuspndRdTrk instruction.

6. The processing device of claim 1, wherein the resume read set tracking instruction is an XResumeRdTrk instruction.

7. The processing device of claim 1, wherein the transaction comprises a group of load and store instructions that are executed by the processing device atomically.

8. A method, comprising:
   entering a transactional execution mode for execution of a transaction by a processing device;
   receiving a load instruction for execution in the transactional execution mode;
   determining, by the processing device, that the received load instruction is marked with a suspend attribute, wherein the suspend attribute is added to the load instruction responsive to the load instruction occurring during a suspend region of the transaction; and
   responsive to determining that the received load instruction is marked, excluding, by the processing device, an address corresponding to the received load instruction from a read set maintained for the transaction, wherein store instructions occurring in the suspend region are not marked with the suspend attribute and are treated as transactional store instructions in the transactional execution mode.

9. The method of claim 8, wherein the transaction comprises a group of load and store instructions that are executed by the processing device atomically.

10. The method of claim 8, wherein the suspend region is a portion of the transaction designated by a suspend read tracking instruction and a resume read tracking instruction.

11. The method of claim 10, wherein the suspend read set tracking instruction is an XSuspndRdTrk instruction, and wherein the resume read set tracking instruction is an XResumeRdTrk instruction.

12. The method of claim 8, further comprising:
    receiving another load instruction for execution in the transactional execution mode;
    determining that the another load instruction is not marked with the suspend attribute; and
    responsive to determine that the another load instruction is not marked, adding an address corresponding to the another load instruction to the read set.

13. The method of claim 8, wherein the read set comprises a data structure maintained in a L1 cache of the processing device.

14. The method of claim 8, wherein the address corresponding to the marked load instruction is added to the read set as least recently used (LRU) entry in the read set.

15. A system comprising:
    a read set data structure to store addresses corresponding to load instructions occurring during a transaction executed by the processing device; and
    a transactional memory (TM) read set tracking component circuitry to:
       identify a suspend read tracking instruction within the transaction;
       mark load instructions occurring in the transaction subsequent to the identified suspend read tracking instruction with a suspend attribute, wherein addresses corresponding to the marked load instructions are excluded from the read set data structure, wherein store instructions in a suspend region designated by the suspend read tracking instruction are not marked with the suspend attribute and are treated as transactional store instructions;

identify a resume read tracking instruction within the transaction, wherein the resume read tracking instruction designates an end of the suspend region; and stop marking the load instructions occurring subsequent to the identified resume read tracking instruction with the suspend attribute.

16. The system of claim 15, wherein the read set comprises a data structure maintained in a L1 cache of the processing device.

17. The system of claim 15, wherein the transaction is designated by a begin transaction instruction and an end transaction instruction.

18. The system of claim 15, wherein the addresses corresponding to the marked instructions are added to the read set as least recently used (LRU) entries in the read set.

19. The system of claim 15, wherein the suspend read set tracking instruction is an XSuspndRdTrk instruction, and wherein the resume read set tracking instruction is an XResumeRdTrk instruction.

20. The system of claim 15, wherein the transaction comprises a group of load and store instructions that are executed by the processing device atomically.

* * * * *